United States Patent
Onmori

(10) Patent No.: US 7,419,114 B2
(45) Date of Patent: Sep. 2, 2008

(54) LEADER TAPE

(75) Inventor: Shozo Onmori, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/798,839

(22) Filed: May 17, 2007

(65) Prior Publication Data

US 2007/0272783 A1  Nov. 29, 2007

(30) Foreign Application Priority Data

May 17, 2006  (JP) .............................. 2006-137923

(51) Int. Cl.
*G11B 15/66* (2006.01)
(52) U.S. Cl. .................. 242/332.4; 242/532.1; 360/132
(58) Field of Classification Search ............. 242/332.4, 242/332.7, 532, 532.1, 582; 360/132
See application file for complete search history.

(56) References Cited

U.S. PATENT DOCUMENTS

| | | | | |
|---|---|---|---|---|
| 3,773,276 A | * | 11/1973 | Ganske | .................... 242/532.4 |
| 3,809,218 A | * | 5/1974 | Furst | |
| 4,333,619 A | * | 6/1982 | Schoettle et al. | |
| 6,360,979 B1 | * | 3/2002 | Larson | .................... 242/332.4 |
| 6,505,788 B1 | * | 1/2003 | Taki et al. | .................... 360/132 |
| 2006/0032959 A1 | * | 2/2006 | Hiraguchi et al. | ......... 242/332.4 |

FOREIGN PATENT DOCUMENTS

JP  2004-342203 A  12/2004

* cited by examiner

*Primary Examiner*—William A Rivera
(74) *Attorney, Agent, or Firm*—Sughrue Mion, PLLC

(57) ABSTRACT

A leader tape that is joined at an end portion of a recording tape wound on a reel and that, when pulling out the recording tape, is pulled out by a pullout member of a drive device and conveyed on a predetermined path by guide members of the drive device, wherein recessed portions are formed in a surface of the leader tape that abuts with the guide members, is provided.

8 Claims, 5 Drawing Sheets

LEADER TAPE

CROSS-REFERENCE TO RELATED APPLICATION

This application claims priority under 35 USC 119 from Japanese Patent Application No. 2006-137923, the disclosure of which is incorporated by reference herein.

BACKGROUND

1. Technical Field

The present invention relates to a leader tape that is joined to an end portion of a recording tape wound around a reel.

2. Related Art

A recording tape cartridge is known where a recording tape such as magnetic tape is wound around a single reel and the reel is housed inside a case. This type of cartridge is used as a information recording/playback medium for devices such as computers. A leader tape acting as a leader member is fixed to the leading end of this recording tape. The leader tape is pulled out from the recording tape cartridge with a pullout portion provided at a drive device side. This is designed so that the recording tape fixed to this leader tape is wound around a windup reel at the drive device side. (See Japanese Patent Application Laid-Open No. 2004-342203.)

When being wound to the windup reel, the leader tape and the recording tape are guided by plural guide rollers to move on a predetermined tape path. At this time, since the leader tape contacts close to the guide rollers, sliding resistance increases so scratches appear on the side of the leader tape that slides against the guide rollers.

SUMMARY

The objective of the present invention is to provide a leader tape with which sliding resistance due to contact with the guide rollers can be kept low, and whose surface that contacts with the guide rollers is less likely to be scratched.

In order to achieve the above-described objective, a leader tape of a first aspect of the present invention is joined at an end portion of a recording tape wound on a reel and that, when pulling out the recording tape, is pulled out by a pullout member of a drive device and conveyed on a predetermined path by guide members of the drive device. Recessed portions are formed in the surface of the leader tape that abuts with the guide members.

In the first aspect, recessed portions are formed on the surface of the leader tape that abuts with the guide members of the drive device. Due to this, when the leader tape is pulled out by the pullout member of the drive device and taken up onto a take-up reel (i.e., a reel on the take-up side), and when the leader tape contacts with the guide members provided in the path on which the leader tape is conveyed, the contact area between the leader tape and these guide members diminishes. That is, the sliding resistance that occurs when the leader tape contacts with the guide members decreases, and the surface of the leader tape that contacts with the guide members (i.e., the surface at the side opposite to the side facing the reel) is less likely to be scratched.

Also, when the leader tape slides against the guide members, dust adhered to the guide members enters into the recessed portions so it becomes unnecessary to periodically clean off the dust adhered to the guide members.

The leader tape of a second aspect of the present invention has the recessed portions provided in groove shapes along the longitudinal direction of the leader tape.

In the second aspect, groove-shaped recessed portions are provided along the longitudinal direction of the leader tape. That is, by providing the recessed portions along the direction in which the leader tape is conveyed, a part of the leader tape is in contact with the guide members at any given time. For this reason, the leader tape is conveyed to the take-up reel side in a stable state.

The leader tape of a third aspect of the present invention has the recessed portions provided in groove shapes along the direction perpendicular to the longitudinal direction of the leader tape.

In the third aspect, groove-shaped recessed portions are provided along the direction perpendicular to the longitudinal direction of the leader tape. Due to this, the leader tape is not in a state of prolonged contact with predetermined positions of the guide members. Accordingly, there is no danger of wear at the predetermined positions of the guide members. Also, since the recessed portions are provided along the direction in which the leader tape is conveyed, it is easier for dust adhered to the guide members to enter into the recessed portions.

The leader tape of a fourth aspect of the present invention has the recessed portions made into groove shapes in a direction slanted relative to the longitudinal direction of the leader tape.

In the fourth aspect, groove-shaped recessed portions are provided in a direction that is slanted relative to the longitudinal direction of the leader tape. Due to this, the guide members receive less resistance from the corner portions of the recessed portions so the leader tape is conveyed smoothly by the guide members.

The leader tape of a fifth aspect of the present invention has plural recessed portions provided in parallel.

In the fifth aspect, plural recessed portions are provided in parallel so the contact area between the leader tape and the guide members decreases. Accordingly, the sliding resistance can be reduced even further.

The leader tape of a sixth aspect of the present invention has the recessed portions made into plural dot shapes.

In the sixth aspect, by providing plural dot-shaped recessed portions, the contact area between the leader tape and the guide members diminishes.

The present invention is configured as described above so a leader tape can be obtained where sliding resistance due to the contact with the guide rollers can be kept low and further, the surface that contacts with the guide rollers is less likely to be scratched.

BRIEF DESCRIPTION OF THE DRAWINGS

Exemplary embodiments of the present invention will be described in detail based on the following figures, wherein.

DETAILED DESCRIPTION

A leader tape 30 according to a first embodiment of the present invention will be described. First, descriptions will be given regarding a recording tape cartridge 10 in which a magnetic tape 25, to which the leader tape 30 is connected, is housed. Note that in FIG. 1, the direction in which the recording tape cartridge 10 is loaded into the drive device is indicated with the A arrow, and is set as the forward direction (i.e., front side) of the recording tape cartridge 10. The direction of the B arrow perpendicular to the A arrow is set as the right direction (i.e., right side).

Figure 1:
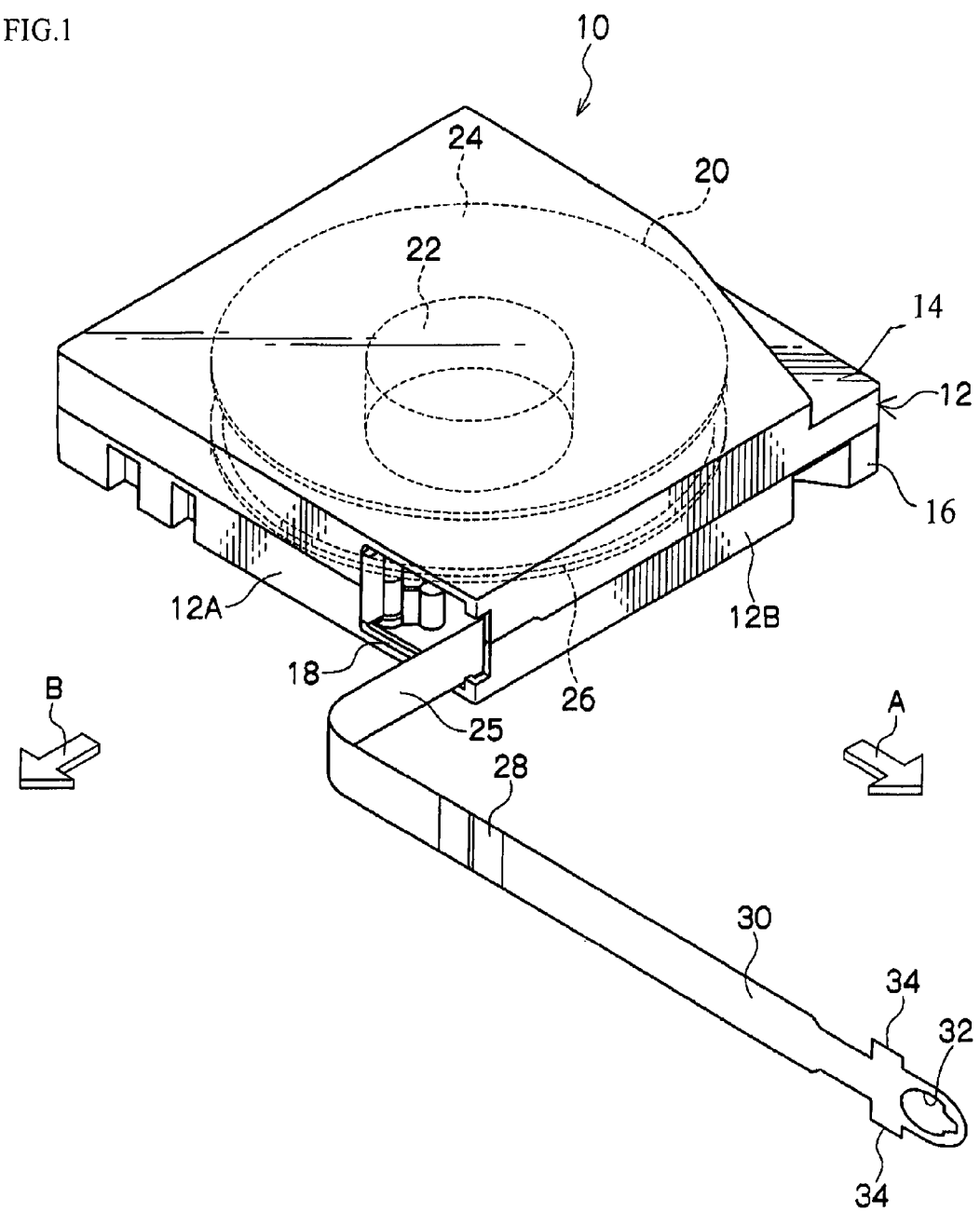
FIG. 1 is a schematic perspective view of a recording tape cartridge provided with a leader tape of a first embodiment of the present invention.

As shown in FIG. 1, the recording tape cartridge 10 has a substantially rectangular box-shaped case 12. A reel 20 is rotatably housed in the interior of the case 12. This reel 20 comprises a cylindrical reel hub 22 with a bottom that forms an axial center portion, an upper flange 24 that is integrally formed with and provided at the upper end portion of the reel hub 22, and a bottom flange 26 that is deposited with ultrasonic waves to the bottom end portion of the reel hub 22. The magnetic tape 25 is wound around the outer peripheral surface of the reel hub 22 as an information recording/playback medium, and the edges in the widthwise direction of the wound magnetic tape 25 are retained by the upper flange 24 and bottom flange 26.

An opening 18 for pulling out the magnetic tape 25 wound on the reel 20 is formed in a wall 12A of the case 12. The free end portion of the magnetic tape 25 pulled out from this opening 18 has the leader tape 30 made of plastic attached thereto with a splice tape 28 that acts as a connective tape.

A hole 32 is provided at the leading end of the leader tape 30. The hole 32 is engaged with the leading end portion of a take-up leader 42 of a drive device 40 (see FIG. 2) that will be described later. The magnetic tape 25 is pulled out from the case 12 by making the leading end portion of the take-up leader 42 engage with this hole 32.

Overhanging portions 34 that overhangs respectively toward the up and down directions are formed at both the upper and lower sides slightly more towards the rear (i.e., towards the magnetic tape 25 side) of the end of this hole 32. These overhanging portions 34 are configured to be housed (i.e., inserted) into housing depressions (not shown) that are formed respectively in the inner surfaces of an upper case 14 and bottom case 16 in the vicinity of the opening 18, whereby the leader tape 30 is arranged (i.e., retained) along a wall 12B in the case 12.

Figure 2:
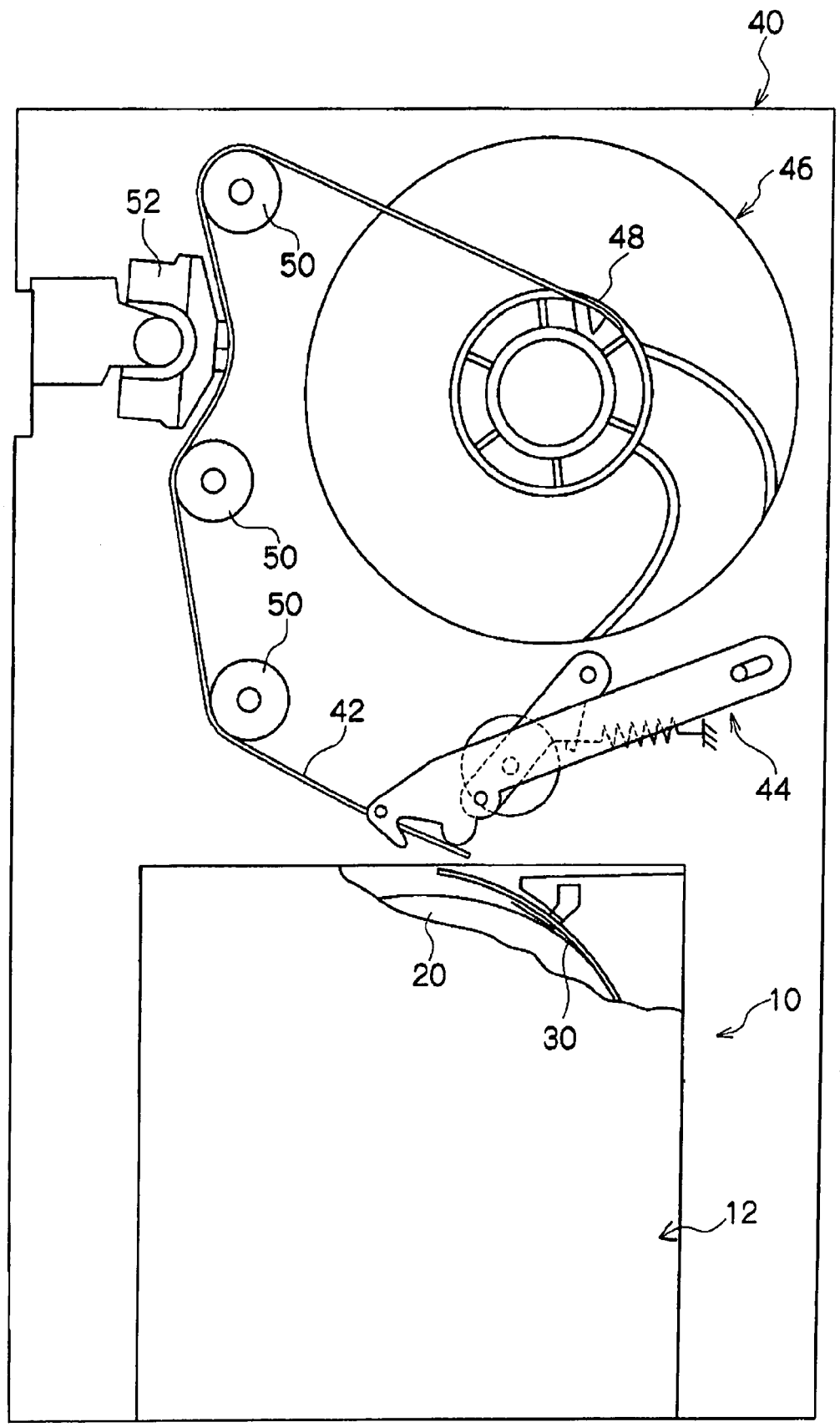
FIG. 2 is a top view showing a state where the recording tape cartridge is loaded in a drive device.

When the magnetic tape 25 is to be used (i.e., when information is recorded to the magnetic tape 25, or information recorded to the magnetic tape 25 is played back), the recording tape cartridge 10 configured as described above is loaded to the drive device 40, as shown in FIG. 2.

When the recording tape cartridge 10 is loaded into the drive device 40, a reel gear provided at the reel 20 meshes with a drive gear of the drive device 40 (gears not shown). Then the reel 20 is rotated due to the rotational driving of the drive gear.

At this time, the leading end portion of the take-up leader 42 of the drive device 40 (see FIG. 2) is inserted through the hole 32 at the leading end of the leader tape 30 (see FIG. 1) by the action of a buckling mechanism 44.

The end portion of the take-up leader 42 is fixed to a reel hub 48 of a take-up reel 46. The leader tape 30 and the magnetic tape 25 are conveyed along a predetermined tape path formed by plural guide rollers 50 while being taken up onto the reel hub 48 of the take-up reel 46.

Note that at this time, the reel 20 of the recording tape cartridge 10 is driven to rotate in sync with the take-up reel 46 by the drive gear meshed with the reel gear.

A recording/playback head 52 is arranged at the tape path. The recording of information to the magnetic tape 25, or the playback of information recorded to the magnetic tape 25, is performed with this recording/playback head 52.

When the magnetic tape 25 is taken up onto the take-up reel 46 all the way to the end, the reel 20 and the take-up reel 46 are made to rotate drive in the opposite direction and the magnetic tape 25 is rewound to the reel 20.

Figure 3B:
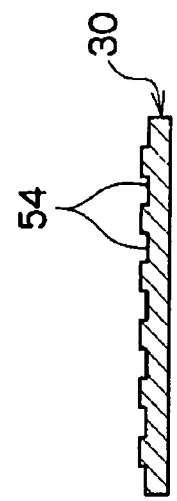
FIG. 3B is a cross-sectional view showing the leader tape cut along the direction perpendicular to the longitudinal direction thereof.
Figure 3A:
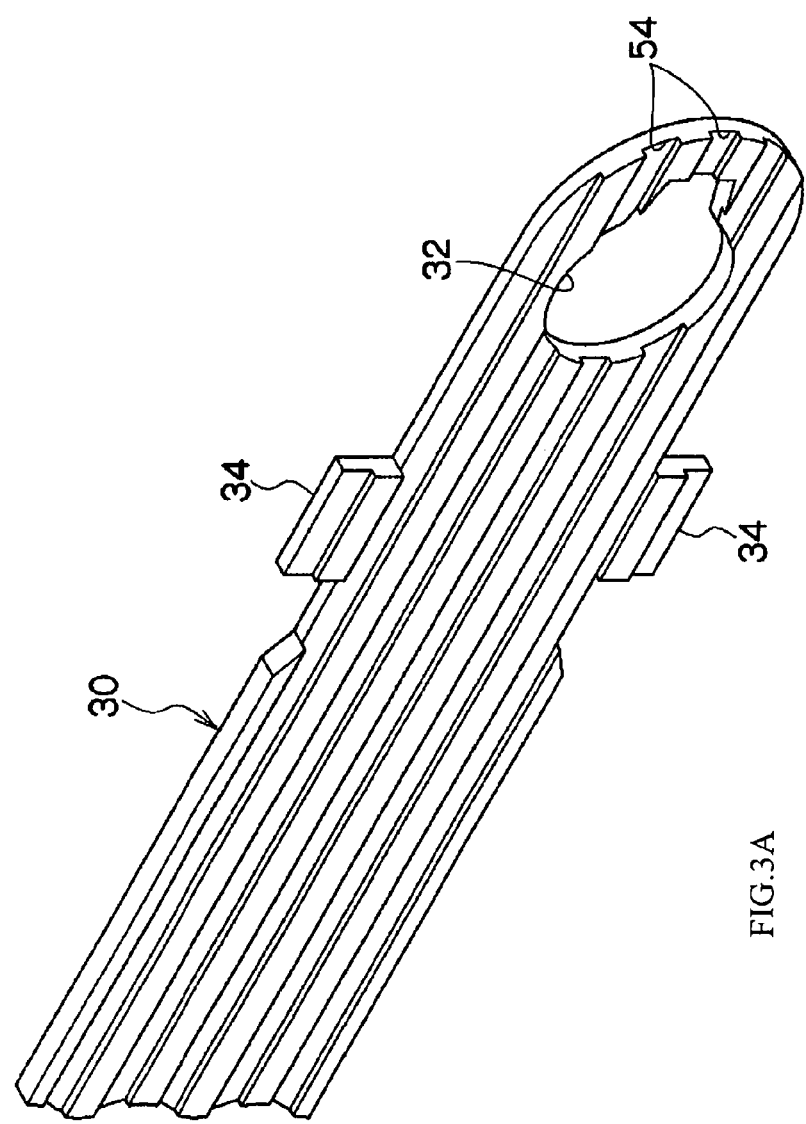
FIG. 3A is a partial perspective view of the leader tape.

Here, as shown in FIGS. 3A and 3B, the surface of the leader tape 30 at one side (i.e., the surface that abuts with the guide rollers 50) is provided with plural groove-shaped recessed portions 54 formed along the longitudinal direction thereof. Note that in FIGS. 3A and 3B, the thickness of the leader tape 30 is made thicker than necessary and the recessed portions 54 are exaggerated.

The recessed portions 54 are formed at a depth of approximately 10% of the thickness of the leader tape 30 in the surface at one side of the leader tape 30, whose thickness is 190 μm. The depth of the recessed portions 54 in the present embodiment is from 20 to 30 μm.

Due to this, when the leader tape 30 is conveyed along the predetermined tape path, the recessed portions 54 of the leader tape 30 are in a state of no-contact with the guide rollers 50 (see FIG. 2), and only the areas surrounding the recessed portions 54 are in a state of contact with the guide rollers 50. That is, the overall region of the leader tape 30 across the widthwise direction thereof does not contact with the guide rollers 50 so the contact area between the leader tape 30 and the guide rollers 50 diminishes.

Due to this, the sliding resistance during the leader tape 30 being in contact with the guide rollers 50 decreases so scratches are less likely to occur on the surface at one side of the leader tape 30 (i.e., the surface in contact with the guide rollers 50).

Also, when the leader tape 30 slides against the guide rollers 50, dust that is adhered to the guide rollers 50 enters into the recessed portions 54. Accordingly, it becomes unnecessary to periodically clean off the dust adhered to the guide rollers 50.

Further, by providing the recessed portions 54 along the direction in which the leader tape 30 is conveyed, a portion of the leader tape 30 contacts with the guide rollers 50 at any given time. For this reason, the leader tape 30 is conveyed to the take-up reel 46 side in a stable state.

Note that when punching out the leader tape 30 is punched out from the original fabric with a punch mold for forming the leader tape 30, the recessed portions 54 are simultaneously formed on the surface of the leader tape 30. A method of forming the recessed portions 54 with cutting work in the surface of a punched-out leader tape 30 can also be used.

Note that in the present embodiment, a configuration is described where plural groove-shaped recessed portions 54 are formed in one surface of the leader tape 30 along the longitudinal direction. Nonetheless, it is not absolutely necessary to form plural recessed portions 54, as long as at least one or more recessed portions 54 are formed.

Next, descriptions will be given regarding a leader tape 60 according to a second embodiment of the present invention. Note that descriptions regarding the portions that are the same as in the first embodiment will be omitted.

Figure 4A:
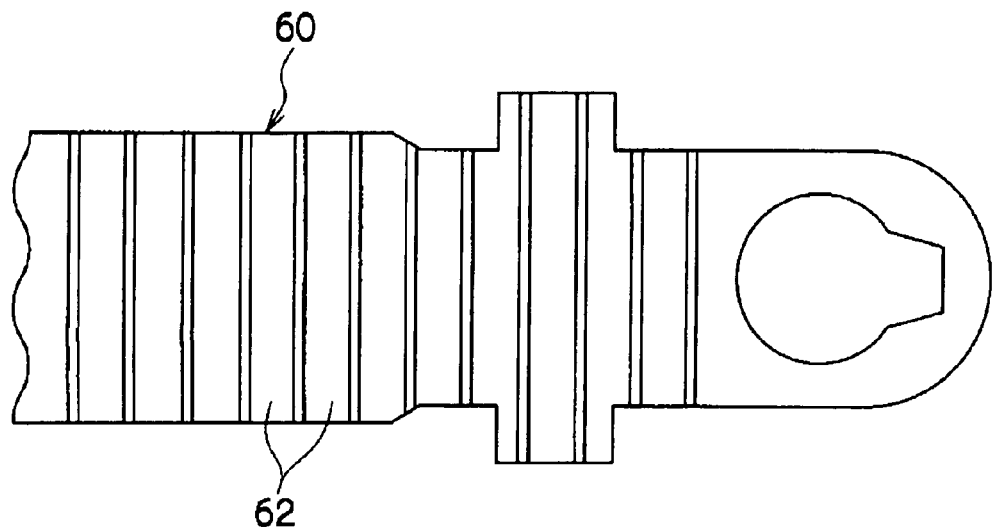
FIG. 4A is a top view of a leader tape of a second embodiment of the present invention.

As shown in FIG. 4A, plural recessed portions 62 are formed in one surface of the leader tape 60 at predetermined intervals along the direction that is perpendicular to the longitudinal direction. That is, plural recessed portions 62 are formed at predetermined intervals along the direction in which the leader tape 60 is conveyed.

Due to this, there is no state of prolonged contact between the leader tape 60 and the predetermined positions of the guide rollers 50 (see FIG. 2), so there is no danger of wearing at only the predetermined positions of the guide rollers 50.

Further, the recessed portions 62 are provided at predetermined intervals along the direction in which the leader tape 60 is conveyed, so it becomes easier for dust adhered to the guide rollers 50 to enter into the recessed portions 62.

Figure 4B:
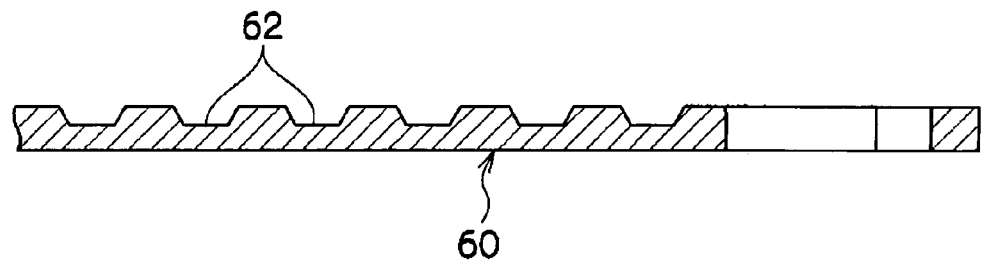
FIG. 4B is a cross-sectional view showing the leader tape of the second embodiment of the present invention cut along the longitudinal direction thereof.

Also, as shown in FIG. 4B, the corner portions of the recessed portions 62 are tapered. Due to this, when the leader tape 60 contacts with the guide rollers 50, scratches are less likely to occur on the guide rollers 50 due to the corner portions of the leader tape 60. Further, when compared to when the corner portions of the recessed portions 62 are not tapered, the sliding resistance that occurs during the contact between the leader tape 60 and the guide rollers 50 can be kept low.

Figure 5A:
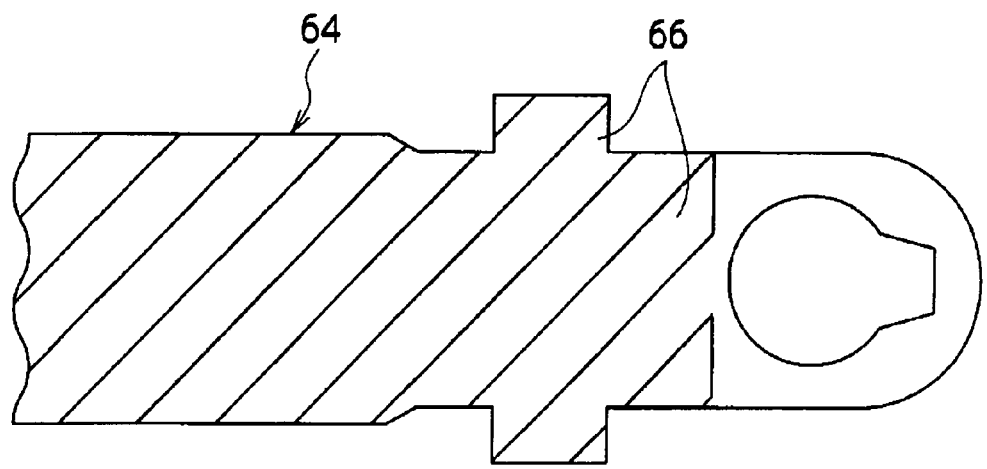
FIG. 5A is a top view of a leader tape of another embodiment.
Figure 5B:
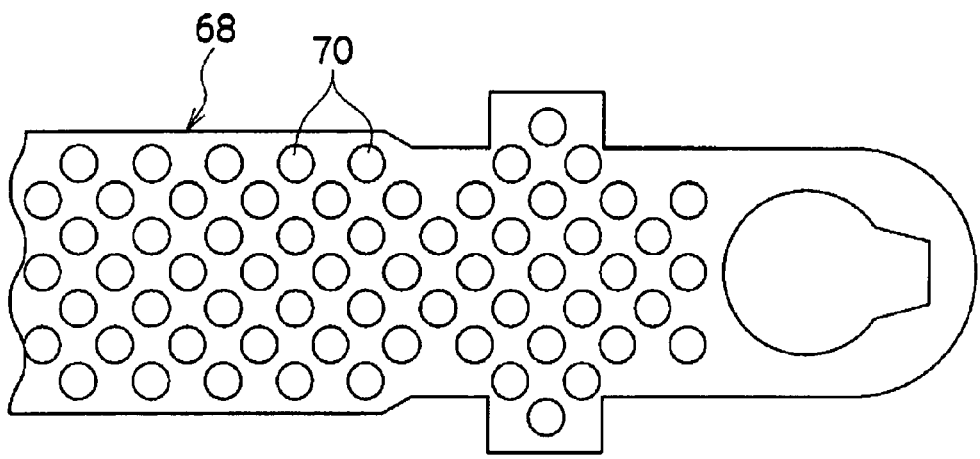
FIG. 5B is a top view of a leader tape of still another embodiment.

Note that in the first embodiment, an example is described where plural recessed portions 54 are formed in the leader tape 30 along the longitudinal direction, and in the second embodiment, an example is described where plural recessed portions 62 are formed in the leader tape 60 along the direction that is perpendicular to the longitudinal direction. However, the recessed portions formed in the leader tape are not limited to the above-described embodiments. For example, as shown in FIG. 5A, a leader tape 64 can be used in which plural recessed portions 66 are formed thereon with a slant relative to the longitudinal direction. Also, as shown in FIG. 5B, a leader tape 68 can be used in which plural recessed portions 70 are formed in dot patterns.

What is claimed is:

1. A leader tape joined at an end portion of a recording tape wound on a reel, comprising:
   recessed portions formed in a first surface of the leader tape that abuts with guide members of a drive device when the leader tape is pulled out by a pullout member of the drive device and conveyed on a predetermined path by the guide members.

2. The leader tape of claim 1, wherein the recessed portions are grooves formed substantially along the longitudinal direction of the leader tape.

3. The leader tape of claim 1, wherein the recessed portions are grooves formed along a direction substantially perpendicular to the longitudinal direction of the leader tape.

4. The leader tape of claim 3, wherein corner portions of the recessed portions are tapered.

5. The leader tape of claim 1, wherein the recessed portions are grooves formed in a direction slanted relative to the longitudinal direction.

6. The leader tape of claim 1, wherein a plurality of recessed portions are provided in parallel.

7. The leader tape of claim 1, wherein the recessed portions are formed into a plurality of dot shapes.

8. The leader tape of claim 1, wherein the leader tape has a second surface that opposes the first surface, and
   wherein the recessed portions do not extend through the second surface.

* * * * *